May 5, 1925.  
W. C. STEVENS  
1,536,459  
MACHINE FOR THE MANUFACTURE OF TIRE CASINGS  
Original Filed Nov. 14, 1918 4 Sheets-Sheet 1

May 5, 1925.  1,536,459
W. C. STEVENS
MACHINE FOR THE MANUFACTURE OF TIRE CASINGS
Original Filed Nov. 14, 1918    4 Sheets-Sheet 2
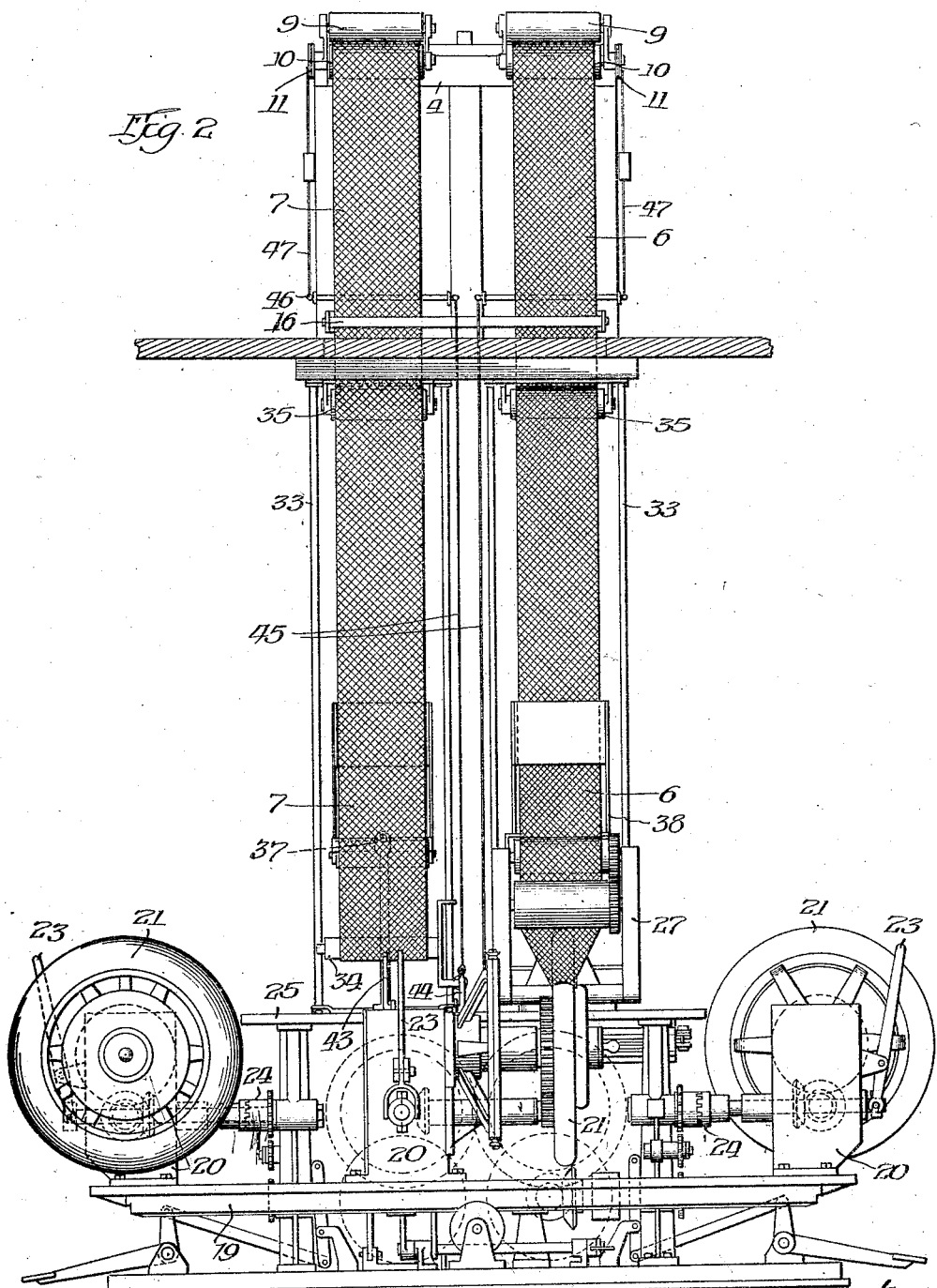

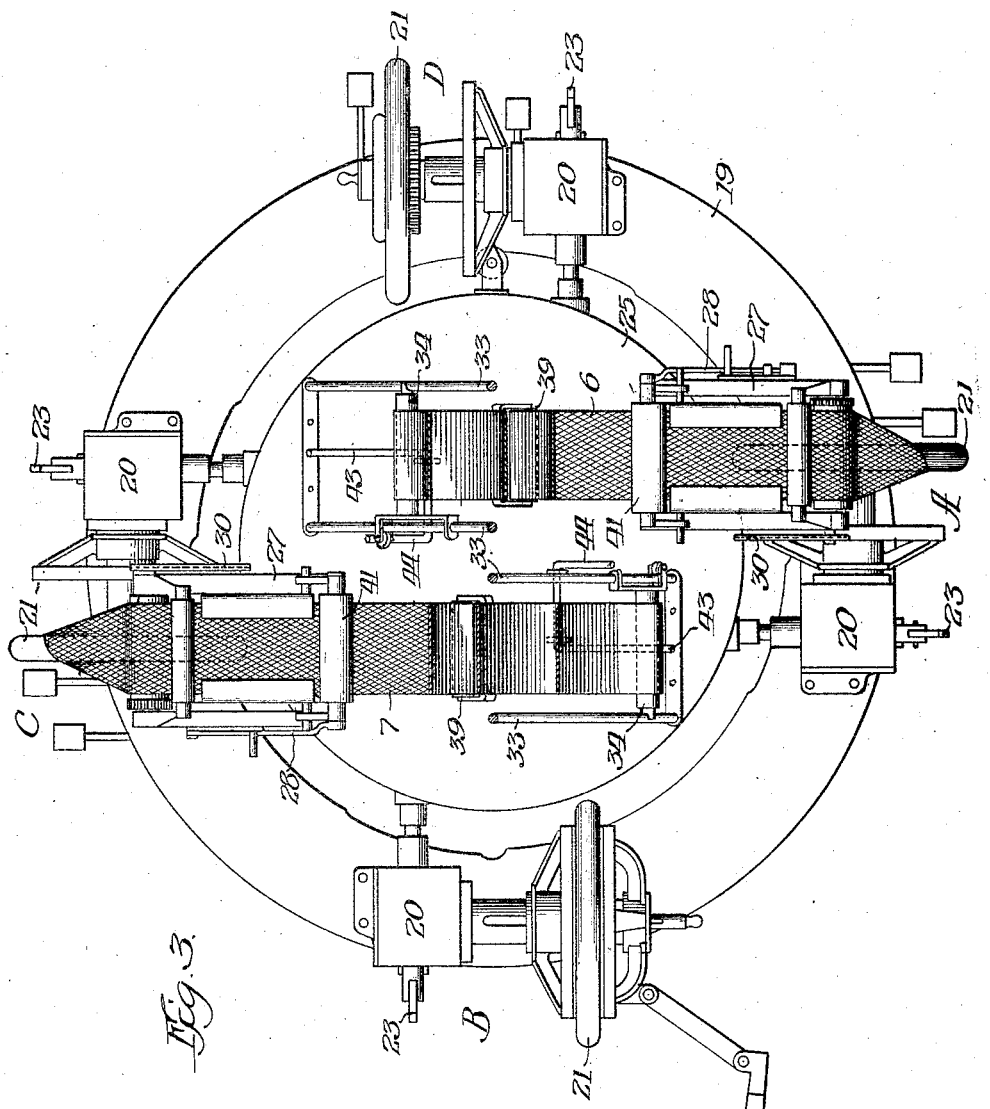

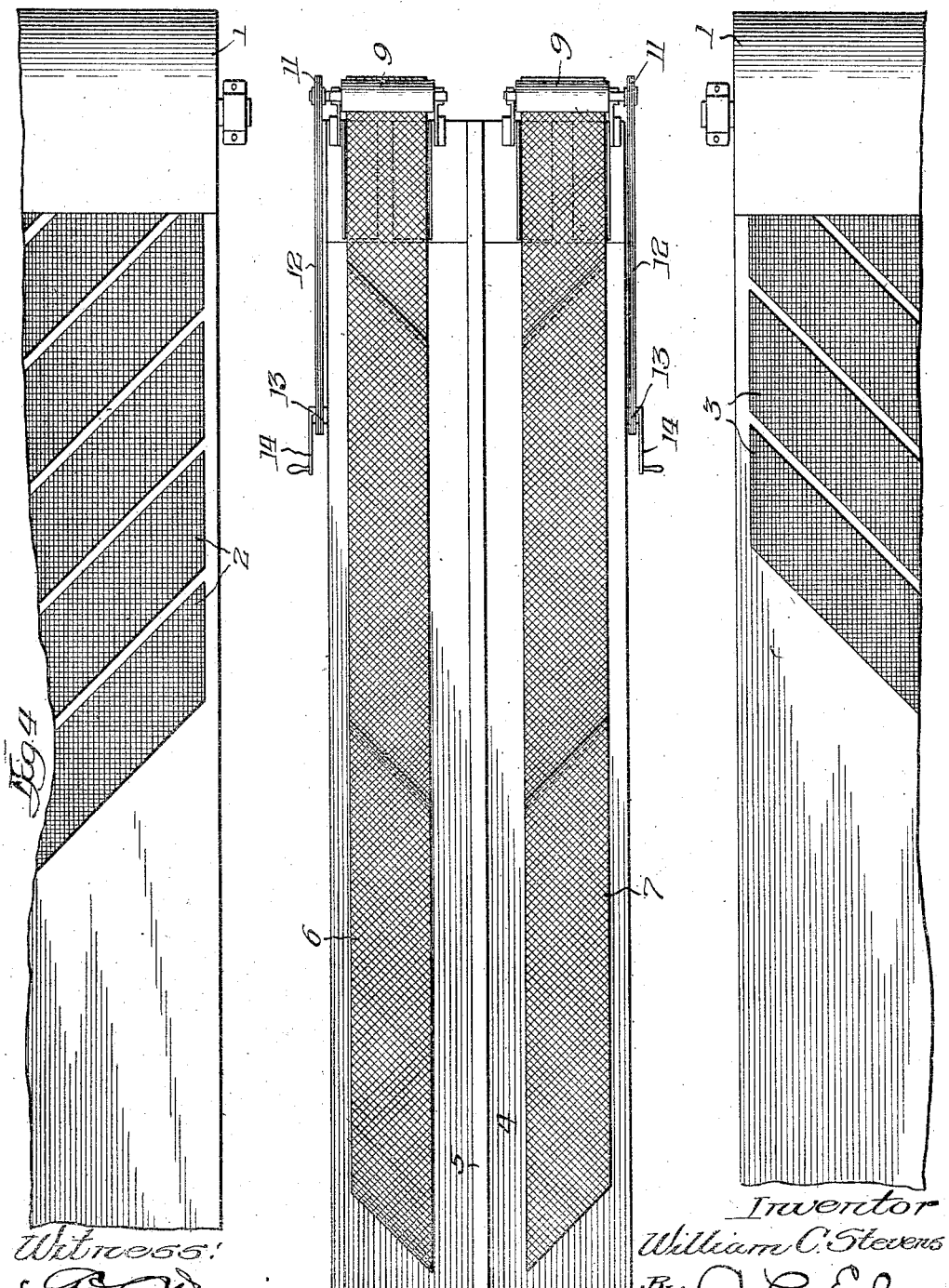

Patented May 5, 1925.

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

MACHINE FOR THE MANUFACTURE OF TIRE CASINGS.

Application filed November 14, 1918, Serial No. 262,495. Renewed April 23, 1921. Serial No. 463,905.

*To all whom it may concern:*

Be it known that I, WILLIAM C. STEVENS, a citizen of the United States, residing at Akron, in the county of Summit, State of Ohio, have invented certain new and useful Improvements in Machines for the Manufacture of Tire Casings, of which the following is a specification.

In the manufacture of tires it has been the practice heretofore to assemble the parallel strips of bias fabric in a continuous strip which is rolled up between turns of cotton liner into rolls which are placed in the tire machines.

The present method of handling fabric presents many disadvantages which it is the purpose of the present invention to overcome, the mechanism herein shown being an improvement on that shown and described in my prior Patent No. 1,398,749, November 29, 1921, reissue Patent No. 15,772, dated February 19, 1924.

By the use of the apparatus herein shown, the fabric passes directly from tables on which it is assembled in continuous strips, directly to the tire machine. When led directly from assembling tables the apparatus dispenses with the use of the cotton liner which has been used heretofore in the fabric rolls. Furthermore, the stock comes fresh from the tables and is in better condition to be made into the tire carcass. One of the features of the apparatus herein shown is the mechanism for forming a loop or storage supply of the fabric by means of which sufficient fabric is at hand to be used in the machine and the workman is enabled to observe the location of the splices in the oncoming fabric so as to be able to position the fabric to avoid the superposing of splices.

The apparatus forming the subject matter of this invention comprises a tire making machine of any well known type, it being preferred to use that form of machine which is shown and described in my copending application, Serial No. 256,429, filed October 1, 1918, this being particularly applicable for use in connection with the apparatus for the reason that the first or under bead layers of fabric are applied and shaped to the core at one point while the over bead layers are applied and shaped to the core at a second point on the machine. In accordance with the practice in the art, the layers of fabric which compose the carcass are of differing widths due to their positions in the carcass and with relation to the bead. The fabric is, therefore, formed into narrow and wide strips which are led to the points of application where the appropriate shaping mechanism is located.

Although the particular form of tire machine has been shown in which the core is moved to different stations, the fabric supplying mechanism is not necessarily limited to that form of machine as it may be used with other types of machines, as will be apparent.

In the drawings there is shown one form of apparatus for carrying out the present invention, but it is obvious that changes may be made without departing from the scope of the present invention.

Fig. 2 is a front elevation at right angles to Fig. 1.

Fig. 3 is a section on the line 3—3 of Fig. 1.

Fig. 4 is a plan view of the assembling tables.

Figure 1:
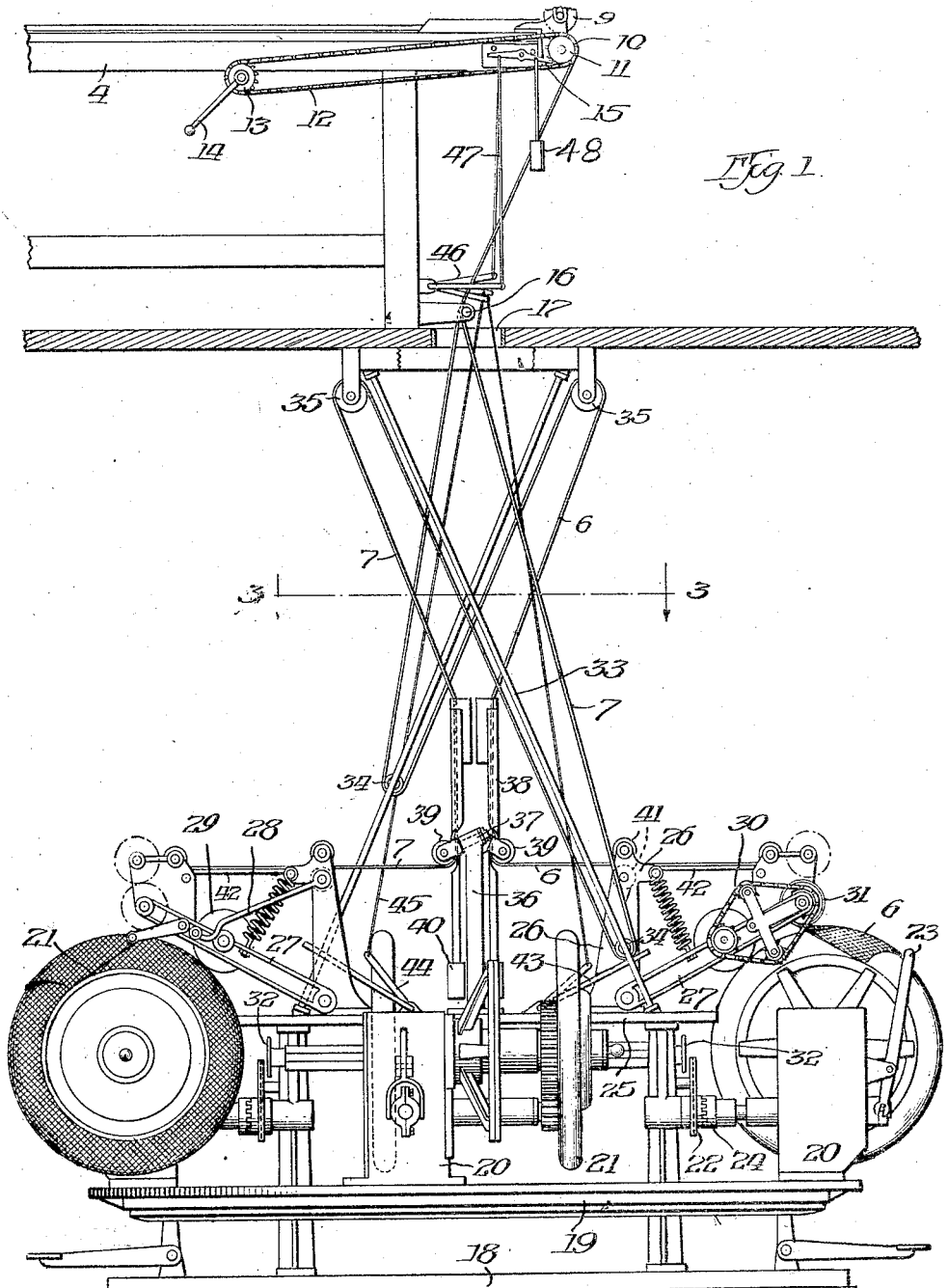
Fig. 1 is a side elevation of the apparatus.

In the form of the invention shown herein the pieces of fabric cut on the bias are wound up in a roll of liner fabric 1 in the condition in which they are received from the bias cutter. The liner is unrolled by any suitable mechanism over a horizontal surface leaving the fabric strips exposed in position to be removed by the operator. The fabric is cut on the bias cutter in two widths for the reasons explained heretofore, the narrow or under-bead pieces being shown at 2 and the wide or over-bead pieces being shown at 3. In place of the rolls of fabric and liner as shown, it is possible to use "books" or other equivalent devices for storing the bias fabric after being received from the bias cutter, or to lead the pieces directly from the bias cutter to the points at which they are assembled.

Between the two supplies of bias pieces, however arranged, is placed an assembling table 4 divided longitudinally by a strip 5, providing surfaces on which the fabric pieces are placed end to end and spliced by the assemblers who stand between the bias supplies and the table. The continuous strip of narrow fabric is shown at 6 and the wide fabric at 7. At the forward end of the table are arranged fabric guides 8 for each strip, through which the fabric passes to pairs of rolls 9 and 10, the lower one of each pair being provided with a sprocket wheel 11, over which is trained a sprocket chain 12 to a second sprocket 13 provided with a handle 14. When the table is filled, the operator rotates the crank 14 passing the strip of fabric through the rolls and into the machine. A detent or latch 15 is arranged to engage with some part of the mechanism to constitute a stop device to prevent the passage of the fabric when the tire making machine is full or when sufficient fabric has been passed out from the assembling table, the operation of which feature will be described later.

The two strips of fabric pass in parallelism from the rolls 9 and 10 over a guide roller 16 and through a hole 17 in the floor to the remainder of the apparatus which is preferably located on the floor below or at a lower level.

Under the forward end of the table is arranged a tire machine, which is of the form shown in my prior application above identified, which comprises a base 18 which supports a revoluble turntable 19 on which are arranged a number of core supporting and revolving standards 20. Four of these standards are shown supporting cores 21, each of which is rotated from any suitable source of power, through a clutch 22, which is arranged to be connected or disconnected by a lever 23 shifting the movable member 24 of the clutch.

Located centrally of the turn table is a stationary platform 25 which supports a stretching mechanism designed to elongate the bias fabric centrally and deliver it to the core. This mechanism may be of any desirable type, the one shown herein being preferred by me. Two of these stretching mechanisms are provided, one for each width of fabric, and located on opposite sides of the machine to operate upon the different widths of fabric, and to deliver the fabric to the cores in their two positions.

Each stretching mechanism comprises a standard or pair of standards 26 on the lower ends of which are pivoted swinging arms 27, provided with lever mechanism 28 to raise and lower them. Midway of each arm is mounted a retarding roller 29 which is connected by suitable gearing 30 to a stretching roller 31, the arrangement being such that a certain percentage of stretch is imparted to the fabric.

At this point it will be noted that the cores occupy the four positions shown in the drawing, at which points, A, B, C, and D, respectively, the first plies are laid on the core, the beads applied, the second or over-bead plies are placed on the core, the carcass trimmed, the finished carcass removed and a new core put in place.

At positions A and C are arranged any suitable form of shaping mechanism to shape the fabric to the core. Spinning rollers 32 are shown, which are arranged to be advanced radially of the core to shape the fabric to the core. This form of shaping mechanism may be replaced by any other suitable device for laying the fabric to the core. It will also be noted from an inspection of Fig. 3 that the stretching mechanism and cores are not in a direct line so that the two lengths of fabric can be fed to the two different positions without interference, the fabric guides 8 being spaced apart a distance commensurate with the distance between the two cores.

Between the fabric assembling tables and the tire machine is arranged a festooning device or loop-forming mechanism. In the form shown this mechanism comprises pairs of parallel rods 33 which serve as guides for freely movable dance rolls 34 and at the upper end of the guides are mounted rolls 35. In the central part of the table are secured uprights 36 to the upper end of which at 37 is pivoted, so as to be capable of moving freely, a guide plate 38 midway whereof is a roller 39. Each strip of fabric passes from the roller 16 down over the dance roller, up to the guide roller 35, into the guiding plate 38 and around the roller 39. A counter weight 40 is fastened to the lower end of the guide and serves to yieldingly maintain it in upright position, allowing it to move should the fabric run a little out of true. This device insures that the fabric will be fed straight into the tire machines and will not crinkle or buckle in its passage. From the roller 39 each strip of fabric passes between two guide rollers 41 on the upper end of the standards over a plate 42 and into the stretching mechanism.

On the top of the plate 25 are pivoted two levers or triggers 43, each of which projects between the pairs of guides 33 at the lowermost point, being arranged so that the roller 34 rests on the lever at the limit of its downward travel. The arm 43 is connected to a second arm 44 which is in turn connected to a rod 45. The upper end of each rod is connected to a second lever 46 which operates a second rod 47, the upper end of which is jointed to the pivoted detent 15 described above. A weight 48 is suspended from the dog 15, the tendency of which is to release the dog from engagement with the sprocket.

When the roll 34 approaches the bottom of its travel, at which point it strikes the end of the lever 43, the detent is forced into engagement with the sprocket and feeding of the fabric is arrested. When, however, the fabric is drawn off by the rotation of the core, through the stretching mechanism the roll 34 is raised, releasing the dog, and the fabric may be fed out from the assembling tables. By this arrangement, the operator at the assembling table cannot pass fabric out faster than it can be used by the machine, leaving exposed in the loop slightly more fabric than is necessary for a single operation at each point about the machine.

It will be seen that the detent and its operating mechanism not only prevent the feeding of too great a quantity of fabric to the machine, but it constitutes a signalling device by which the assembler on the upper floor will be apprized of the fact that the fabric is being drawn on to the core, and may be thereby governed in passing the fabric out from the assembling table. Furthermore, the arrangement may constitute a means of signalling between the tire machine operator and the assembling table operator. It will also be noted that the detent constitutes a feed stopping or restraining device which is released when the core is rotated to draw fabric from the loop, as the drawing of the fabric raises the dance roller from the lever, whereupon the detent drops away from its sprocket wheel.

Many of the details shown in this application may be varied without departing from this invention. The form of tire making machine may be varied and instead of having a machine with a core shifting apparatus, as shown, the core may be maintained in one place and the fabric fed to the core from two different sources to feed the differing widths of fabric. The loop forming mechanism may be varied and the stretching mechanism shown is given only as an example. Other modifications may be made without changing the invention or departing from the scope of the appended claims.

I claim:

1. In a machine for manufacturing tires, the combination of an assembling table, a tire making machine, means for conducting fabric from said assembling table to said tire machine comprising guide rollers over which the fabric passes to the machine, and a dance roller for forming an intermediate loop in said fabric between the machine and the assembly table.

2. In a machine for manufacturing tires, the combination of an assembling table, a tire making machine, stretching mechanism on said tire machine, guide rollers for conducting said fabric from said assembling table into said stretching mechanism, a pair of guide rods, and a dance roller arranged to move on said rods to form a loop in said fabric.

3. In a machine for manufacturing tires, the combination of an assembling table, a tire making machine, a core supported on said machine, means to shift said core in two positions, means to guide two strips of bias fabric from the table to the core in its two positions, and means governed by the rotation of the core for permitting said fabric to pass from said assembling table.

4. In a machine for manufacturing tires, the combination of an assembling table, a tire making machine, a core rotatably supported on said machine, means for guiding said fabric from the table to the core, and governing mechanism controlled by the drawing of the fabric on to said core to control the operation of said guiding means.

5. In a machine for manufacturing tires, the combination of an assembling table, a tire making machine, a core rotatably supported on said machine, means for feeding said fabric from the table to said core, a detent to prevent the feeding of said fabric, and means actuatable upon drawing of the fabric on the core for releasing said detent.

6. In a machine for manufacturing tires, the combination of an assembling table, a tire making machine, a core rotatably supported on said machine, rollers at said table for conducting said fabric toward the tire machine, a detent to prevent the rotation of said roller, and means for releasing said detent operable upon drawing of said fabric on the core.

7. In a machine for manufacturing tires, the combination of an assembling table, a tire making machine, a core rotatably supported on said machine, means for feeding the fabric from the table to the machine, a stop device for said feeding device, a loop forming roller, and stop actuating mechanism in the path of said loop forming roller.

8. In an apparatus for manufacturing tires, the combination of a source of supply for the fabric, a tire machine, a support for a plurality of cores on said machine, means for shifting said cores into two positions on said machine, means for feeding said fabric from the source of supply to the cores in their two positions, and stop mechanism for preventing the feeding of said fabric.

9. In an apparatus for manufacturing tires, the combination of a fabric assembling table, a tire machine, means for feeding the fabric from the table to the tire machine, means for restraining said feeding means, and means operable upon actuation of said tire machine to render said restraining means ineffective.

10. In an apparatus for manufacturing tires, the combination of a fabric assembling table, a tire machine, a support for a plurality of cores on said machine, means for shifting said cores into two positions on said machine, means for feeding said fabric from the assembling table to the cores in their two positions, and stop mechanism for preventing the feeding of said fabric.

11. In an apparatus for manufacturing tires, the combination of a source of supply for fabric, a tire making machine, means for feeding said fabric from the source of supply to said machine, loop forming mechanism between the source of supply and the machine, and means operable on the formation of a loop to arrest said feeding means.

12. In an apparatus for manufacturing tires, the combination of a source of fabric supply, a tire machine, a support for a plurality of cores on said machine, means for shifting said cores into two positions on said machine, means for feeding said fabric from its source to said machine, loop forming mechanism between the source of supply and the machine, and means operable on the formation of a loop to arrest said feeding means.

13. In an apparatus for manufacturing tires, the combination of a source of fabric supply, a tire machine, means for feeding said fabric from its source to said machine, a dance roller around which said fabric passes on its way to the machine and a signalling device in the path of said dance roller communicating with the source of supply.

14. In an apparatus for manufacturing tires, the combination of a fabric assembling table, a tire machine, means for feeding said fabric from the assembling table to said machine, a dance roller around which said fabric passes on its way to the machine and a signalling device in the path of said dance roller indicating the amount of fabric between the table and the machine.

15. In an apparatus for manufacturing tires, the combination of a tire machine, supporting means at which the fabric is assembled to form a strip, means for feeding said fabric strip direct to said machine from the point of assembly, and a signalling device from said machine to said supporting means.

16. In an apparatus for manufacturing tires, the combination of a tire machine, supporting means at which the fabric is assembled to form a strip, means for feeding said fabric strip direct to said machine from the point of assembly, loop forming mechanism, and a signalling device at the assembly point actuated by said loop forming mechanism.

17. In an apparatus for manufacturing tires, the combination of a tire machine, supporting means at which the fabric is assembled to form a strip, means for feeding said fabric from the point of assembly to said machine, stretching mechanism on said machine, and a pivoted fabric guide for passing said fabric into said stretching mechanism.

18. In an apparatus for manufacturing tires, the combination of a tire machine, supporting means at which the fabric is assembled to form a strip, means for feeding said fabric strip from the point of assembly to said machine, loop forming mechanism, stretching mechanism, and a pivoted guide for passing said fabric strip into said stretching mechanism.

19. In a tire making machine, a source of fabric supply, a core, means for feeding fabric from the source of supply to the core, a storage supply forming mechanism between the source of supply and the core, and means actuated by the filling or exhaustion of the storage supply to render the feeding means inoperative or operative, respectively.

20. In a tire making machine, a guiding member through which the fabric passes on its way to the core, said guide being yieldingly mounted on a pivot located at the center line of the fabric to shift the fabric laterally.

21. In a tire making machine, a guiding member, a single pivotal support for the guiding member, said guiding members contacting the edges of the fabric, and being shiftable by lateral shifting of the fabric.

22. In a tire making machine a roller over which the fabric passes on its way to the core, a pivotal mounting for said roller whereby the axis of the roller may be tilted, a member attached to the roller mounting adapted to contact the fabric and be moved by the lateral shifting of the fabric.

23. In a tire making machine, a roller over which the fabric passes on its way to the core, a pivoted mounting for said roller whereby the axis of the roller may be tilted, a guiding plate movable with the axis of the roller, adapted to receive the fabric and be moved by the lateral shifting thereof.

24. A tire making machine having in combination, a source of fabric supply, a core, fabric feeding means adapted to create a reserve supply of fabric between the source of supply and the core, and means for automatically controlling the operation of said feeding means.

25. A tire making machine having in combination, a source of fabric supply, a core, a festooning device located between the source of supply and the core, and means for automatically controlling the amount of fabric in the festoon.

26. A tire making machine having in combination, a source of fabric supply, a core, a festooning device located between the source of supply and the core, and means actuated by the rotation of the core for controlling the amount of fabric in the festoon.

27. A tire making machine having in combination, a source of fabric supply, a core, and means driven independently of the core for feeding the fabric from said supply to the core, the said means being controlled by the rotation of the core.

28. A tire making machine having in combination, a plurality of cores, a source of fabric supply for each of said cores, means for feeding the fabric to the cores adapted to create reserve supplies of fabric between the respective supplies and cores, and means controlled by the rotation of the cores for controlling the operation of the feeding means.

29. A tire making machine having in combination, a plurality of rotating cores, sources of fabric supply for the cores, festooning devices located between the supply sources and the cores, and means actuated by the rotation of the cores for controlling the amount of fabric in the festoons.

WILLIAM C. STEVENS.